United States Patent [19]

Davidson et al.

[11] Patent Number: 5,000,978
[45] Date of Patent: Mar. 19, 1991

[54] ELECTROSTATIC COATING OF DETERGENT GRANULES

[75] Inventors: Todd B. Davidson; Frank J. Mueller, both of Cincinnati, Ohio

[73] Assignee: The Procter & Gamble Company, Cincinnati, Ohio

[21] Appl. No.: 373,376

[22] Filed: Jun. 29, 1989

[51] Int. Cl.$^5$ .......................... B05D 7/24; B05D 1/06; B05D 3/12
[52] U.S. Cl. ........................................ 427/27; 427/212; 427/222; 427/242
[58] Field of Search .................. 427/27, 212, 222, 213, 427/242; 252/174.13, 140, 174.25, 383, 385

[56] References Cited

U.S. PATENT DOCUMENTS

| | | | |
|---|---|---|---|
| 3,868,336 | 2/1975 | Mazzola et al. | 252/527 |
| 3,901,184 | 8/1975 | Payne et al. | 118/629 |
| 4,027,366 | 6/1977 | Millar et al. | 428/623 |
| 4,209,550 | 6/1980 | Hagenbach et al. | 427/212 X |
| 4,248,911 | 2/1981 | Wixon | 427/214 |
| 4,260,651 | 4/1981 | Wixon | 427/214 |
| 4,339,335 | 7/1982 | Wixon | 252/8.8 |
| 4,347,152 | 8/1982 | Wixon | 252/174 |
| 4,380,320 | 4/1983 | Hollstein et al. | 239/697 |
| 4,411,809 | 10/1983 | Wixon | 252/91 |
| 4,414,130 | 11/1983 | Cheng | 252/140 |
| 4,637,891 | 1/1987 | Delwel et al. | 252/135 |
| 4,639,326 | 1/1987 | Czempik et al. | 252/91 |
| 4,666,738 | 5/1987 | Wixon | 427/214 |
| 4,666,740 | 5/1987 | Wixon | 427/214 |
| 4,702,932 | 10/1987 | Cosentino et al. | 427/212 X |
| 4,780,331 | 10/1988 | Cobbs, Jr. et al. | 427/25 |

FOREIGN PATENT DOCUMENTS

| | | |
|---|---|---|
| 3014226 | 10/1981 | Fed. Rep. of Germany . |
| 243702 | 3/1987 | German Democratic Rep. . |
| 48-9472 | 3/1973 | Japan . |
| 61-272300 | 12/1986 | Japan . |
| 62-45696 | 2/1987 | Japan . |
| 62-68897 | 3/1987 | Japan . |
| 62-183880 | 8/1987 | Japan . |
| 62-218499 | 9/1987 | Japan . |
| 62-240397 | 10/1987 | Japan . |
| 62-263299 | 11/1987 | Japan . |
| 63-23997 | 2/1988 | Japan . |
| 63-23998 | 2/1988 | Japan . |
| 63-92699 | 4/1988 | Japan . |
| 63-199797 | 8/1988 | Japan . |

*Primary Examiner*—Evan Lawrence
*Attorney, Agent, or Firm*—Kathleen M. Harleston; Donald E. Hasse; Thomas H. O'Flaherty

[57] ABSTRACT

A process for making coated detergent granules by producing detergent granules and then uniformly distributing finely divided powder onto the surfaces of the detergent granules by means of an electrostatic charging and delivery system. The detergent granules are comprised of from about 10 to 20 weight % water so that the finely divided powder adheres to the moist detergent granules even after the electrostatic change dissipates.

13 Claims, No Drawings

ELECTROSTATIC COATING OF DETERGENT GRANULES

TECHNICAL FIELD

This invention relates to electrostatically coating detergent granules. More particularly, it relates to a process for making coated detergent granules which comprises producing detergent granules, and then uniformly distributing finely divided powder onto the surfaces of the detergent granules by means of an electrostatic charging and delivery system. It also relates to detergent granules made according to this process.

BACKGROUND OF THE INVENTION

Electrostatics is a branch of physics that deals with the phenomena of electrical charge attraction and repulsion. Electrostatic systems have been used to improve coating efficiency, for example, of paints applied to metallic products such as refrigerators, desks and automobiles.

The use of electrostatic delivery systems to apply various powdered coating compositions on electrically conductive objects is described in German OLS Patent Application 3 014 226, Weigel, published Oct. 15, 1981 (powder lacquer mixed with a nonpigmented powder lacquer to form a "solid mixture" is electrostatically applied to electrically conductive objects to increase film properties against external influences) and Japanese Patent Publication 48-9472, Sakai et al., publication date Mar. 24, 1973 (powder composition containing polyamide mixed with N-substituted sulfonamide for electrostatic coating of metal objects).

In electrostatic powder coating, an electrostatic charge is imparted to the powder, which is then delivered to the object to be coated. The object is held at electrically ground potential and the powder coats the object because of the attractive force between the grounded object and the charged powder. In an electrostatic powder spray gun, the powder is pushed through a central passageway by pressurized gas. The central passageway contains electrodes which ionize the air surrounding them. The powder traveling by the electrodes acquires these ionic charges. The charged powder is then emitted from the gun, usually in a conical spray pattern, in the area of the object to be coated.

U.S Pat. No. 4,780,331, Cobbs, Jr. et al, issued Oct. 25, 1988, describes a particular method and apparatus for charging powder particles by electrostatic induction. See also U.S. Pat. No. 4,380,320, Hollstein et al., issued Apr. 19, 1983 (nozzle assembly for an electrostatic spray gun).

Electrostatics is in use for industrial finishing applications. It is used for coating relatively large objects one at a time, such as hubcaps, metal desks, and cans. Examples of commonly used powder coating materials are epoxy, polyester, and porcelain. The art describing application of powder to objects generally speaks of grounded, usually metallic, larger, single objects, rather than individual, small, ungrounded, nonmetallic particles.

The use of a finely divided powder coating on granular detergent compositions to improve detergent flowability and decrease lumping and caking is known. See U.S. Pat. No. 3,868,336, Mazzola et al., issued Feb. 25, 1975 (finely divided flow-promoting agent externally applied to a heat-dried detergent composition to inhibit caking); Japanese Patent 86-333245 (granular detergent composition prepared by (a) kneading certain detergent components, (b) comminuting this solid mixture, and (c) covering the comminuted mixture with water-insoluble, finely divided powder of a primary particle size not above 10 microns); and Japanese Patent 62-45696 (granular detergent composition which is a pulverization product of a detergent ingredient mixture coated with water-insoluble fine powder of an average grain size less than 10 microns and containing other specific detergent ingredients).

U.S. Pat. No. 4,027,366, Millar et al., issued June 7, 1977, discloses a process for electrostatically applying a multi-layered coating on a substrate in one operation. A mixture of powders is used as the coating composition. At least one of the powders is a film-forming non-conductive polymer. The powdered composition is applied to a conductive substrate which has a neutral charge or a charge opposite from that of the coating composition powder particles. According to Millar et al, the powders then stratify into layers and adhere to the substrate because of contact or static electrification for a reasonable length of time and until at least one of the powders can be cured or fused to form the final coating.

Aluminosilicates, or zeolites, are of particular interest as finely divided powders for detergent granule coating. A series of Wixon patents describe heavy duty laundry detergents comprised of particles having nonionic detergent in the interior and on the surface thereof to which is adhered a coating of smaller particles of ion-exchanging zeolite. Various such heavy duty laundry detergents and methods for making them are disclosed. See Wixon's U.S. Pat. Nos. 4,248,911, issued Feb. 3, 1981; 4,260,651, issued Apr. 7, 1981; 4,339,335, issued Jul. 13, 1982; 4,347,152, issued Aug. 31, 1982; 4,411,809, issued Oct. 25, 1983; 4,666,738, issued May 19, 1987; and 4,666,740, issued May 19, 1987.

In summary, although coating detergent granules with finely divided powder is known, the instant process allows for efficient coating (reduced dust, less powder recycle, less powder required) and better results (uniform distribution over the granules). The use of electrostatics for coating small, numerous, ungrounded, nonmetallic particles, like detergent granules, with finely divided powder is not known.

SUMMARY OF THE INVENTION

The present invention relates to a process for making coated detergent granules which comprises producing detergent granules, and then uniformly distributing the finely divided powder onto the surfaces of the detergent granules by means of an electrostatic charging and delivery system. It also relates to detergent granules made according to that process.

DESCRIPTION OF THE INVENTION

This invention relates to a process for making coated detergent granules, as well as to detergent granules made by this process. The process comprises producing detergent granules and then uniformly distributing finely divided powder onto the surfaces of the detergent granules by means of an electrostatic charging and delivery system.

A. Producing Detergent Granules

There are various ways to produce the detergent granules which will be coated with the finely divided powder in this process. High active detergent surfactant and/or detergency builder granules are suitable. These can be made according to the process described in copending U.S. patent application Ser. No. 364,725, Jolicoeur, filed June 9, 1989. Such detergent granules are made by forming a doughy mass comprising surfactant and/or water-soluble organic polymer and/or detergency builder, and then granulating by mixing a deagglomerating agent into the doughy mass at a high shear rate. The deagglomerating agent is a fine powder having a mean particle size of less than about 200 microns and is most preferably sodium aluminosilicate. The surfactant can be zwitterionic, cationic, ampholytic and/or nonionic. The water-soluble organic polymer can be polyacrylate polymers of molecular weight between about 4,000 and 100,000 and/or polyethylene glycol of molecular weight between about 2,000 and 50,000. The detergency builder can be phosphate, carbonate, silicate, $C_{10-18}$ fatty acids, polycarboxylate, or mixtures thereof.

Also suitable for use herein are high active detergent granules made according to the process described in copending U.S. patent application Ser. No. 364,721, Mueller et al, filed June 9, 1989. Such detergent granules are made by: (a) reacting in a continuous neutralization system alkyl sulfuric acid and/or alkyl benzene sulfonic acid with an alkali metal hydroxide solution, (b) adding to the system polyethylene glycol of molecular weight about 4,000–50,000 and/or certain ethoxylated nonionic surfactants, and (c) forming detergent particles. The alkali metal hydroxide solution is greater than or equal to about 62% by weight of the hydroxide, and the neutralized product has less than or equal to about 12% by weight of water.

Detergent granules made by spray drying are preferred herein. To spray dry, detergent ingredients such as surfactants and builders, are typically mixed in a mix tank to form a slurry which is then atomized in a spray drying tower to substantially reduce moisture. See, for example, U.S. Pat. Nos. 3,629,951 and 3,629,955, both issued Dec. 28, 1971 to Davis et al, incorporated herein by reference.

The detergent granules for use herein comprise detergent surfactant and/or detergency builder.

1. Detergent Surfactant

Detergent surfactants useful herein are selected from anionic, nonionic, zwitterionic, ampholytic and cationic classes and mixtures thereof. Detergent surfactants useful herein are listed in U.S. Pat. No. 3,664,961, Norris, issued May 23, 1972, and in U.S. Pat. No. 3,919,678, Laughlin et al., issued Dec. 30, 1975, both incorporated herein by reference. Useful cationic surfactants also include those described in U.S. Pat. No. 4,222,905, Cockrell, issued Sept. 16, 1980, and in U.S. Pat. No. 4,239,659, Murphy, issued Dec. 16, 1980, both incorporated herein by reference. Of the surfactants, anionics and nonionics are preferred and anionics are most preferred. The following are representative examples of detergent surfactants useful in the present granules.

Water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Useful anionic surfactants also include the water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are the sodium and potassium alkyl sulfates, especially those obtained by sulfating the higher alcohols ($C_{12}$–$C_{18}$ carbon atoms) such as those produced by reducing the glycerides of tallow or coconut oil; and the sodium and potassium alkylbenzene sulfonates in which the alkyl group contains from about 10 to about 16 carbon atoms, in straight chain or branched chain configuration, e.g., see U.S. Pat. Nos. 2,220,099 and 2,477,383. Especially valuable are linear straight chain alkylbenzene sulfonates in which the average number of carbon atoms in the alkyl group is from about 11 to 14, abbreviated as $C_{11-14}$ LAS.

Especially preferred is a mixture of $C_{10-16}$ linear alkylbenzene sulfonate and $C_{10-18}$ alkyl sulfate. These are preferably in a weight ratio of between 50:50 and 80:20, preferably 70:30, sodium $C_{10-16}$ (preferably $C_{11-14}$) LAS:sodium $C_{12-18}$ (preferably $C_{14-16}$) alkyl sulfate.

Other anionic surfactants herein are the sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing about 1 to about 10 units of ethylene oxide per molecule and wherein the alkyl group contains from about 10 to about 20 carbon atoms.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxyalkane-1-sulfonic acids containing from about 2 to 9 carbon atoms in the acyl group and from about 9 to about 23 carbon atoms in the alkane moiety; water-soluble salts of olefin and paraffin sulfonates containing from about 12 to 20 carbon atoms; and beta-alkyloxy alkane sulfonates containing from about 1 to 3 carbon atoms in the alkyl group and from about 8 to 20 carbon atom in the alkane moiety.

Water-soluble nonionic surfactants are also useful in the instant detergent granules. Such nonionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 15 carbon atoms, in either a straight chain or branched chain configuration, with from about 3 to 12 moles of ethylene oxide per mole of alkyl phenol.

Included are the water-soluble and water-dispersible condensation products of aliphatic alcohols containing from 8 to 22 carbon atoms, in either straight chain or branched configuration, with from 3 to 12 moles of ethylene oxide per mole of alcohol.

Semi-polar nonionic surfactants include water-soluble amine oxides containing one alkyl moiety of from abut 10 to 18 carbon atoms and two moieties selected from the group of alkyl and hydroxyalkyl moieties of from about 1 to about 3 carbon atoms; water-soluble phosphine oxides containing one alkyl moiety of about 10 to 18 carbon atoms and two moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Preferred nonionic surfactants are of the formula $R^1(OC_2H_4)_nOH$, wherein $R^1$ is a $C_{10}$–$C_{16}$ alkyl group or a $C_8$–$C_{12}$ alkyl phenyl group, and n is from 3 to about 80.

Particularly preferred are condensation products of $C_{12}$–$C_{15}$ alcohols with from about 5 to about 20 moles of ethylene oxide per mole of alcohol, e.g., $C_{12}$–$C_{13}$ alcohol condensed with about 6.5 moles of ethylene oxide per mole of alcohol.

Ampholytic surfactants include derivatives of aliphatic or aliphatic derivatives of heterocyclic secondary and tertiary amines in which the aliphatic moiety can be straight chain or branched and wherein one of the aliphatic substituents contains from about 8 to 18 carbon atoms and at least one aliphatic substituent contains an anionic water-solubilizing group.

Zwitterionic surfactants include derivatives of aliphatic, quaternary, ammonium, phosphonium, and sulfonium compounds in which one of the aliphatic substituents contains from about 8 to 18 carbon atoms.

Cationic surfactants can also be included in the present detergent granules. Cationic surfactants comprise a wide variety of compounds characterized by one or more organic hydrophobic groups in the cation and generally by a quaternary nitrogen associated with an acid radical. Pentavalent nitrogen ring compounds are also considered quaternary nitrogen compounds. Halides, methyl sulfate and hydroxide are suitable. Tertiary amines can have characteristics similar to cationic surfactants at washing solution pH values less than about 8.5. A more complete disclosure of these and other cationic surfactants useful herein can be found in U.S. Pat. No. 4,228,044, Cambre, issued Oct. 14, 1980, incorporated herein by reference.

Cationic surfactants are often used in detergent compositions to provide fabric softening and/or antistatic benefits. Antistatic agents which provide some softening benefit and which are preferred herein are the quaternary ammonium salts described in U.S. Pat. No. 3,936,537, Baskerville, Jr. et al., issued Feb. 3, 1976, which is incorporated herein by reference.

2. Detergency Builder

Builders are generally selected from the various water-soluble, alkali metal, ammonium or substituted ammonium phosphates, polyphosphates, phosphonates, polyphosphonates, carbonates, silicates, borates, polyhydroxy sulfonates, polyacetates, carboxylates, and polycarboxylates. Preferred are the alkali metal, especially sodium, salts of the above.

Preferred for use herein are the phosphates, carbonates, silicates, $C_{10-18}$ fatty acids, polycarboxylates, and mixtures thereof. More preferred are sodium tripolyphosphate, tetrasodium pyrophosphate, citrate, tartrate mono- and di-succinates, sodium silicate, and mixtures thereof (see below).

Specific examples of inorganic phosphate builders are sodium and potassium tripolyphosphate, pyrophosphate, polymeric metaphosphate having a degree of polymerization of from about 6 to 21, and orthophosphates. Examples of polyphosphonate builders are the sodium and potassium salts of ethylene diphosphonic acid, the sodium and potassium salts of ethane 1-hydroxy-1, 1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, incorporated herein by reference.

Examples of nonphosphorus, inorganic builders are sodium and potassium carbonate, bicarbonate, sesquicarbonate, tetraborate decahydrate, and silicates having a weight ratio of $SiO_2$ to alkali metal oxide of from about 0.5 to about 4.0, preferably from about 1.0 to about 2.4.

Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid.

Polymeric polycarboxylate builders are set forth in U.S. Pat. No. 3,308,067, Diehl, issued Mar. 7, 1967, incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylenemalonic acid.

Other useful builders herein are sodium and potassium carboxymethyloxymalonate, carboxymethyloxysuccinate, cis-cyclohexanehexacarboxylate, cis-cyclopentanetetracarboxylate, phloroglucinol trisulfonate, and the copolymers of maleic anhydride with vinyl methyl ether or ethylene.

Other suitable polycarboxylates for use herein are the polyacetal carboxylates described in U.S. Pat. No. 4,144,226, issued Mar. 13, 1979 to Crutchfield et al, and U.S. Pat. No. 4,246,495, issued Mar. 27, 1979 to Crutchfield et al, both incorporated herein by reference. These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a detergent composition.

Particularly preferred polycarboxylate builders are the ether carboxylate builder compositions comprising a combination of tartrate monosuccinate and tartrate disuccinate described in U.S. Pat. No. 4,663,071, Bush et al., issued May 5, 1987, incorporated herein by reference.

Water-soluble silicate solids represented by the formula $SiO_2.M_2O$, M being an alkali metal, and having a $SiO_2:M_2O$ weight ratio of from about 0.5 to about 4.0, are useful in the instant detergent granules.

3. Additional Ingredients

These detergent granules can also include optional ingredients commonly found in detergent compositions, such as bleaches, bleach activators, suds boosters or suds suppressors, anti-tarnish and anticorrosion agents, soil suspending agents, soil release agents, germicides, pH adjusting agents, non-builder alkalinity sources, chelating agents, smectite clays, enzymes, enzyme-stabilizing agents and perfumes. See U.S. Pat. No. 3,936,537, issued Feb. 3, 1976 to Baskerville, Jr. et al., incorporated herein by reference. Bleaching agents and activators are described in U.S. Pat. No. 4,412,934, Chung et al., issued Nov. 1, 1983, and in U.S. Pat. No. 4,483,781, Hartman, issued Nov. 20, 1984, both of which are incorporated herein by reference.

Chelating agents are also described in U.S. Pat. No. 4,663,071, Bush et al., from Column 17, line 54 through Column 18, line 68, incorporated herein by reference. Suds modifiers are also optional ingredients and are described in U.S. Pat. Nos. 3,933,672, issued Jan. 20, 1976 to Bartoletta et al., and 4,136,045, issued Jan. 23, 1979 to Gault et al., both incorporated herein by reference.

It is preferred that the detergent granules be comprised of from about 5 to 75 weight %, preferably 10 to 50 weight %, detergent surfactant selected from the group consisting of anionic, nonionic, zwitterionic, ampholytic, and cationic surfactants, and mixtures thereof. It is preferred that the detergent granules be further comprised of from about 5 to 75 weight % detergency builder selected from the group consisting of water-soluble, alkali metal, ammonium or substituted ammonium phosphates, polyphosphates, phosphonates, polyphosphonates, carbonates, silicates, borates, polyhydroxy sulfonates, polyacetates, carboxylates, and polycarboxylates.

The detergent granules preferably have a particle diameter range of between about 100 and 1700 microns. The mean particle size is from about 400 to 1200 microns, preferably from about 600 to 1000 microns. To achieve this particle size range, the fine and coarse granules are generally screened out.

B. Glutinous Granules

It is preferred that the detergent granules be sufficiently glutinous for the finely divided powder to adhere to the detergent granules even after the electrostatic charge imparted by the electrostatic charging and delivery system dissipates. The charge generally dissipates within several hours of application. In order to be glutinous, the detergent granules should be hot and/or sticky (moist) during application. Stickiness can be imparted, for example, by increasing the amount of water and/or adding nonionic surfactant in or on the granules during or after production of the granules. However, it is not desirable to make the particles so sticky that they agglomerate.

It is preferred that the instant process further comprise maintaining the detergent granules at a temperature of between about 65° C. and 105° C., preferably between about 80° C. and 95° C., while uniformly distributing finely divided powder onto the detergent granules by means of the electrostatic charging and delivery system. The hot granules are sufficiently glutinous (gummy) for the electrostatically charged finely divided powder to remain affixed once the electrostatic charge dissipates.

Another preferred alternative is that the detergent granules are hot and sticky during application of the finely divided powder. Such granules are comprised of from about 2 to 20 weight %, preferably 4 to 16 weight %, water and are at a temperature of between about 80° C. and 95° C.

Another preferred alternative is that the detergent granules be comprised of from about 10 to 20 weight %, preferably 12 to 15 weight %, water so that the finely divided powder adheres to the detergent granules even after the electrostatic charge dissipates.

The most preferred alternative is that the detergent granules be comprised of a sufficient amount of nonionic surfactant to cause the finely divided powder to adhere to the detergent granules at ambient temperature (about 7° C. to 38° C.) even after the electrostatic charge dissipates. From about 0.5 to 3 weight % nonionic surfactant is preferred.

It is most preferred that the process herein further comprise distributing from about 0.5 to 5 weight %, preferably 1 to 2 weight %, nonionic surfactant on the surfaces of the detergent granules prior to uniformly distributing the finely divided powder onto the detergent granules. This is a middle step between producing the detergent granules and applying the finely divided powder by electrostatics. The preferred way to distribute the nonionic surfactant is to spray it onto the above-described detergent granules while the granules are being tumbled in a rotating mix drum. The nonionic-treated granules can then be placed in a clean rotating mix drum for the next step, electrostatics.

The nonionic surfactant distributed on the surface of the detergent granules (preferred), or incorporated into the granules in an amount sufficient to adhere the electrostatically applied powder, is as described under the section called "Detergent Surfactant" above. Preferred nonionic surfactants for this purpose are aliphatic alcohols containing from 8 to 22 carbon atoms or alkyl phenols having an alkyl group containing from 6 to 15 carbon atoms, in either straight or branched chain configurations, with from 3 to 12 moles of ethylene oxide per mole of alcohol. More preferred are $C_{12-18}$ alcohol polyethoxylate ($E_{3-12}$). Most preferred is coconut alkylethoxylate ($E_6$).

C. Distributing Finely Divided Powder

After producing the detergent granules and optionally making them hot and/or sticky, the finely divided powder is uniformly distributed onto the surfaces of the detergent granules by means of an electrostatic charging and delivery system.

The finely divided powder preferably has a mean particle size of less than about 150 microns, preferably less than about 50 microns, more preferably less than about 25 microns, most preferably less than about 10 microns.

A preferred finely divided powder is selected from the group consisting of aluminosilicate, powdered tripolyphosphate, powdered pyrophosphate, citrate, powdered carbonate, sulfate, and mixtures thereof. A more preferred finely divided powder is selected from the group consisting of sodium aluminosilicate, powdered sodium tripolyphosphate, powdered tetrasodium pyrophosphate, and mixtures thereof. Most preferred is sodium aluminosilicate (zeolite).

The most preferred finely divided powder herein is a water-insoluble crystalline or amorphous aluminosilicate ion exchange material. The preferred crystalline material useful herein is of the formula $$Na_z[(AlO_2)_z.(SiO_2)_y].xH_2O$$

wherein z and y are at least about 6, the molar ratio of z to y is from about 1.0 to about 0.5 and x is from about 10 to about 264. Amorphous hydrated aluminosilicate materials useful herein have the empirical formula $$M_z(zAlO_2 \cdot ySiO_2)$$

wherein M is sodium, potassium, ammonium or substituted ammonium, z is from about 0.5 to about 2 and y is 1, said material having a magnesium ion exchange capacity of at least about 50 milligram equivalents of $CaCO_3$ hardness per gram of anhydrous aluminosilicate.

Preferably about 0.5 to 20 weight % finely divided powder is uniformly distributed onto the surfaces of the detergent granules in this process. More preferably, about 2 to 10 weight %, most preferably about 3 to 6 weight %, sodium aluminosilicate is uniformly distributed onto the surfaces of the detergent granules in this process by means of the electrostatic charging and delivery system.

The finely divided powder should be suitable for use in the particular electrostatic charging and delivery system to be used.

D. Electrostatic System

The finely divided powder is uniformly distributed on the surface of the detergent granules by means of an electrostatic charging and delivery system. U.S. Pat. No. 4,780,331, Cobbs, Jr. et al., issued Oct. 25, 1988, incorporated herein, describes a particular method and apparatus for charging powder particles by electrostatic induction. Generally, the electrostatic charging system contains electrodes which ionize the air surrounding them. The finely divided powder is passed by these electrodes and acquires the ionic charges. The powder is then distributed in the area of the detergent granules. Because of the electrostatic charges, the powder is attracted to and uniformly distributed on the surfaces of the detergent granules. It is not necessary to charge the detergent granules. The detergent granules need not be grounded but the object which contains them, preferably a rotating mix drum, should be grounded or polyethylene coated for safety. When the detergent granules are glutinous during the powder application, there is no need for a curing or fusion step to ensure long-term adhesion of the powder.

The preferred electrostatic system for use herein is an electrostatic powder spray gun. An electrostatic powder spray gun is described in U.S. Pat. No. 4,380,320, Hollstein et al., issued Apr. 19, 1983, incorporated herein. This step preferably comprises charging the finely divided powder in an electrostatic powder spray gun and then spraying the charged finely divided powder from the gun onto the detergent granules.

The most preferred electrostatic powder spray gun for use herein has three parts: a gravity feed hopper, a control console, and the gun itself. The finely divided powder is fed into the gravity feed hopper. The control console has controls for regulating flow rate, fluidizing rate, atomizing rate and voltage level. The type of powder used generally controls which rate settings give the best results. The finely divided powder is channeled from the gravity feed hopper into the central passageway of the gun. Pressurized gas forces the powder through the passageway, where the powder acquires an electrostatic charge and, when a trigger on the gun is pressed by an operator, the charged powder is emitted from the gun in a conical spray pattern.

It is preferred that the electrostatic powder spray gun be mounted on a rotating mix drum. The nozzle of the gun is preferably pointed through an opening in the drum. The detergent granules are preferably falling freely when the cloud of charged powder particles is emitted from the gun. The charged powder particles are attracted to the detergent granules and are uniformly distributed on the surfaces of the granules. Any other method for holding the granules in the area of the charged powder particles can be used; for example, allowing the detergent granules to fall down a chute while spraying them with the charged finely divided powder. The rotary mix drum or chute should be grounded or coated with polyethylene in a manner sufficient to minimize fire and safety hazards.

Using electrostatics to uniformly coat detergent granules with finely divided powder so that they are freeflowing and do not cake or lump has the following advantages over conventional admixing methods:

(a) uniform, complete coverage of the granules,
(b) less finely divided powder is required,
(c) reduced dust and less powder recycle, and
(d) where the granules are glutinous, more permanent adhesion between the finely divided powder and the granule leading to a longer lasting coating.

Detergent granules made by this process can be used as is as a finished granular detergent composition. Alternatively, the instant coated detergent granules can be mixed with other ingredients, such as other detergent granules or builders, to form a granular detergent composition.

The following nonlimiting examples illustrate the process and coated detergent granules of the present invention. All parts, percentages and ratios herein are by weight unless otherwise specified.

EXAMPLE I

Detergent granules having the following composition are produced.

| Detergent Granule Composition | |
|---|---|
| Ingredient | Weight % |
| Sodium C$_{12.3}$ linear alkylbenzene sulfonate | 16.07 |
| Sodium C$_{14-15}$ alkyl sulfate | 6.89 |
| Sodium sulfate | 21.05 |
| Sodium aluminosilicate (Zeolite A, avg. diameter 3-4 microns) | 26.03 |
| Sodium carbonate | 16.57 |
| Sodium silicate (1.6 ratio) | 2.17 |
| Sodium polyacrylate (MW 4500) | 2.41 |
| Polyethylene glycol (MW 8000) | 0.54 |
| Brightener | 0.23 |
| Water | 8.04 |

The above detergent granules are made by first mixing a sodium C$_{12.3}$ linear alkylbenzene sulfonate/sodium C$_{14-15}$ alkyl sulfate mixture (70/30), sodium sulfate, and water in a crutcher. Sodium aluminosilicate, sodium carbonate, sodium polyacrylate and sodium silicate are also added to the crutcher and mixed in. The mixture is then spray dried in a drying tower.

About 49.2 pounds (22.3 kg.) of the above detergent granules are placed in a rotating mix drum and sprayed with 0.75 pounds (0.34 kg.) of coconut alkylethoxylate (6 moles of ethylene oxide).

About 47 pounds (21.3 kg.) of the resulting detergent granules are then placed in a rotating mix drum and about 3 pounds (1.4 kg.) of sodium aluminosilicate is uniformly distributed on the surfaces of the detergent granules using an electrostatic powder spray gun poised at a hole cut in the top of the mix drum.

The sodium aluminosilicate (SAS) is loaded into the electrostatic powder spray gun via a gravity feed hopper (Model #NPE-HC). It is metered into the control console (Model #NPE-CC8). The flow rate, fluidizing rate and atomizing rate on the control panel are set on the highest settings. The voltage is set at 90 kilovolts (maximum setting). The SAS proceeds into a central passageway in the electrostatic gun. When the gun is fired, a fog-like cloud of charged SAS particles is emitted into the Liqui-Pac® 55-gallon drum in which the detergent granules are being rotated.

The SAS particles are uniformly distributed on the surfaces of the freely falling detergent granules. Although the electrostatic charge on the particles is estimated to dissipate within several hours, the SAS particles remain evenly distributed on the detergent granules even after one month.

The coated detergent granules can be used alone or mixed with other ingredients to form a granular detergent composition.

EXAMPLE II

Objective

An experiment is conducted to compare efficiency of several methods, including electrostatics, for applying sodium aluminosilicate (SAS; 3-5 micron mean particle size) onto detergent granules.

Experiment

Detergent granules are made and sprayed with 1.5 weight % coconut alkylethoxylate (6 moles of ethylene oxide) according to Example I. These detergent granules are divided into six samples. The first sample (50 pounds; 22.7 kg) is used as a control.

Three of the samples are coated with 6 weight % SAS. One of these is the second sample, which is coated with 3 pounds (1.4 kg.) of SAS by hand dumping the SAS into a rotating mix drum containing 47 pounds (21.3 kg.) of the detergent granules. The third sample is coated with 3 pounds (1.4 kg.) of SAS by spraying the SAS through the electrostatic powder spray gun described in Example I with the voltage meter set at 0 (no electrostatics) into the rotating mix drum containing 47 pounds (21.3 kg.) of the detergent granules. The fourth sample is coated with 3 pounds (1.4 kg.) of SAS by the same method used in Example I, using 47 pounds (21.3 kg.) of the detergent granules.

The remaining two samples are coated with 3 weight % SAS. One of these is the fifth sample, which is coated with 1.5 pounds (0.7 kg.) of SAS by spraying the SAS through the electrostatic powder spray gun with the voltage meter set at 0 (no electrostatics) into the rotating mix drum containing 48.5 pounds (22 kg.) of the detergent granules. The sixth sample is coated with 3 pounds (1.4 kg.) of SAS by the same method used in Example I, using 48.5 pounds (22 kg.) of the detergent granules.

The samples are as follows:

| Sample # | Treatment |
|---|---|
| (1) Control | none |
| (2) 6% SAS | hand-dumping |
| (3) 6% SAS | spraying |
| (4) 6% SAS | electrostatics |
| (5) 3% SAS | spraying |
| (6) 3% SAS | electrostatics |

Results (1) Process. During mixing of Sample 2, SAS agglomerates form and airborne dust is present, although none is lost to dust control. Use of the spray gun without electrostatics in Samples 3 and 5 is accompanied by excessive amounts of visible airborne dust and 10–20% of the SAS is lost to dust control. Use of electrostatics in Samples 4 and 6 results in no airborne dust and no loss of SAS to dust control.

(2) SEM. Scanning Electron Microscope results show that electrostatics produces the most efficient coating. With electrostatics, 3% of SAS completely and uniformly coats and adheres to the granules (Sample 6). Without electrostatics the coating at 3% is sparse and irregular (Sample 5). With 6% SAS, the coating is complete for all methods (Samples 2–4). With use of electrostatics (Samples 4 and 6), the formation of unattached SAS agglomerates (i.e. not attached to the granule surface) is considerably less relative to the other samples at the same level.

(3) Storage Stability. Under high temperature and high humidity conditions (80° F. or 26.6° C., 80% relative humidity) in open cartons over time, the caking/lumping and flowability properties of the detergent granules are significantly improved for either 3 or 6% SAS (Samples 2–6). The greatest improvement is seen when 6% SAS is added using electrostatics. At the same SAS level, electrostatics provides a slight advantage over other methods for lasting benefit of SAS coating over time (cake grade).

(4) Density. On average, density increases 2.4 oz. per 100 $in^3$ (41.5 g/l) for 3% SAS (Samples 5 and 6). Similarly, density increases 3.5 to 4.0 oz. per 100 $in^3$ (60.5–69.2 g/l) for 6% SAS (Samples 2–4). The density increase for Sample 4 (6% SAS; electrostatics) is 0.5 oz. per 100 $in^3$ (8.6 g/l), which is less than Samples 2 and 3 (6% SAS).

What is claimed is:

1. A process for making coated detergent granules, which comprises producing detergent granules, and then uniformly distributing a finely divided powder onto the surfaces of said detergent granules by means of an electrostatic charging and delivery system, wherein said detergent granules are comprised of from about 10 to 20 weight % water so that said finely divided powder adheres to said moist detergent granules even after said electrostatic charge dissipates.

2. A process according to claim 1, wherein said moist detergent granules are comprised of from about 12 to 15 weight % water.

3. A process according to claim 2, which further comprises distributing from about 0.5 to 5 weight % nonionic surfactant on the surfaces of said detergent granules prior to uniformly distributing said finely divided powder onto said detergent granules.

4. A process according to claim 1, wherein said electrostatic charging and delivery system is an electrostatic powder spray gun.

5. A process according to claim 4, which further comprises charging said finely divided powder in said electrostatic powder spray gun and then spraying said charged finely divided powder from said electrostatic powder spray gun onto said detergent granules.

6. A process according to claim 5, wherein said detergent granules are comprised of from about 0.3 to 3.0 weight % nonionic surfactant and are falling freely while being sprayed by said charged finely divided powder from said electrostatic powder spray gun.

7. A process according to claim 6, which further comprises rotating said detergent granules in a rotary mix drum or allowing them to fall down a chute while spraying said charged finely divided powder onto said detergent granules.

8. A process according to claim 1, wherein said detergent granules have a particle diameter range of between about 100 and 1700 microns.

9. A process according to claim 1, wherein said finely divided powder has a mean particle diameter of less than about 25 microns.

10. A process according to claim 1, wherein said finely divided powder is sodium aluminosilicate.

11. A process according to claim 10, which comprises uniformly distributing about 2 to 10%, by weight of the detergent granules of said sodium aluminosilicate onto the surfaces of said detergent granules by means of said electrostatic charging and delivery system.

12. A process according to claim 11, wherein said detergent granules are comprised of from about 5 to 75 weight % detergent surfactant selected from the group consisting of anionic, nonionic, zwitterionic, ampholytic, and cationic surfactants, and mixtures thereof.

13. A process according to claim 12, wherein said detergent granules are further comprised of from about 5 to 75 weight % detergency builder selected from the group consisting of water-soluble, alkali metal, ammonium or substituted ammonium phosphates, polyphosphates, phosphonates, polyphosphonates, carbonates, silicates, borates, polyhydroxy sulfonates, polyacetates, carboxylates, and polycarboxylates.

* * * * *